United States Patent

Senge et al.

Patent Number: 5,459,499
Date of Patent: Oct. 17, 1995

[54] HYDROPHOBING AGENT

[75] Inventors: Carsten Senge; Jörg Erdmann; Jana Dahlmeier, all of Berlin, Germany

[73] Assignee: Eastman Kodak Company, Rochester, N.Y.

[21] Appl. No.: 27,831

[22] Filed: Mar. 8, 1993

[30] Foreign Application Priority Data

Mar. 3, 1992 [DE] Germany .......................... 42 07 626.9

[51] Int. Cl.$^6$ ................................................... B41J 2/165
[52] U.S. Cl. ........................................................... 347/45
[58] Field of Search ...................................... 347/45

[56] References Cited

U.S. PATENT DOCUMENTS 5,121,134  6/1992  Albinson et al. ................... 347/45

FOREIGN PATENT DOCUMENTS 0150430  10/1987  European Pat. Off. .
9014958  12/1990  WIPO .

*Primary Examiner*—Benjamin R. Fuller
*Assistant Examiner*—Valerie Ann Lund
*Attorney, Agent, or Firm*—Willard G. Montgomery

[57] ABSTRACT

A hydrophobing agent (30) includes chain-like, cross-linkable, halogen-containing copolymers, a cross-linking agent, where the cross-linking agent enters into cross-linking bonds with the copolymers, and at least two solvents with differing boiling points. The weight of the components and the boiling points of the solvents are provided such that the first solvent is substantially already evaporated upon application on the surface (9) to be coated, whereas the second solvent evaporates substantially only after the application onto the surface (9) under formation of a hydrophobically acting layer attached to the surface (9).

18 Claims, 2 Drawing Sheets

HYDROPHOBING AGENT

BACKGROUND OF THE INVENTION

1. Field of the Invention

The invention relates to a hydrophobing agent for the treatment of a surface, in particular, of a nozzle ejection opening surface of a liquid-operating print head, comprising
  a) chain, cross-linkable halogen-containing copolymers,
  b) cross-linkable agent, which engages in cross-linking bonds with the copolymers, and
  c) a solvent.

2. Brief Description of the Background of the Invention Including Prior Art:

Hydrophobing agents provide and convey to the treated surface a repellent and dewetting effect both against aqueous as well as against organic solvents. Surfaces which are barely or not at all wettable by liquids can be desired in various fields of technology. In case of metallic surfaces, this can be required for the avoidance and elimination of corrosion. In connection with other objects, a wetting of the surface can be undesirable for technical reasons. For example, in case of print heads, the wetting behavior of the nozzle ejection opening surface in the area of the nozzle openings is of substantial importance for the achievable print quality.

A hydrophobing agent for the surface treatment, in particular for the nozzle ejection opening surface of an ink jet print head, is known in this context from the Printed European Patent Document WO 90/14958. The hydrophobing agent includes a silane as an active component, wherein an at least in part fluorinated organic group is bonded via a saturated radical to the silicon. This hydrophobing agent is liquid at room temperature and can be applied for example by dipping, by spraying, or by vapor deposition onto the surface to be treated. The application, however, has to be performed in a dry, absolutely water-free atmosphere. For this purpose, the hydrophobing agent is for example heated in a closed chamber comprising the body to be treated. The hydrophobing agent is in this case deposited onto the surfaces to be coated. The kind and the uniformity of the deposit determines directly the uniformity and stability of the formed hydrophobing agent layer.

A hydrophobing agent of the initially recited kind based on cross-linkable fluorine-containing copolymers is known from the Printed European Patent Document EP-B1-0,150,430. The copolymers are dissolved in an organic solvent, for example, an aliphatic alcohol or polyglycol. By addition of a cross-linking agent or hardener adhesion-stable, corrosion-resistant and weather-resistant, primers can be generated from these copolymers. A layer formed from these known hydrophobing agents exhibits however in case of mechanical load, for example a frequent wiping, only an insufficient long-term stability of the adhesion properties and can only insufficiently cover regions with insufficient partial adhesion. In addition, the known hydrophobing agent covers and coats dirt particles disposed on the surfaces only insufficiently such that these dirt particles can serve as a nuclei for an undesired liquid accumulation on the coated surface. A further problem of the known hydrophobing agent comprises that, in case of application from a vapor phase or by spraying onto the surface to be treated, there are generated islands, which are formed by an insufficient converging of the hydrophobing agent droplets deposited on the surface. This converging of the hydrophobing agent droplets is substantially dependent on the viscosity at the point in time of the application. The viscosity is essentially influenced by the original weight component part and the boiling point of the employed solvent as well as by the evaporation of the employed solvent caused by the application. At any rate, it is difficult with the known hydrophobing agent of the Printed European Patent Document EP-B1-0,150,430, to generate a uniform coating, since a relatively large solvent component allows in fact a good converging of the applied hydrophobing agent droplets, but that however, at the same time the applied hydrophobing agent, based on the high content in solvent, tends to an undesirable running off from the surface to be treated. A relative small solvent component at the time of application avoids in fact the undesired running off, however, this increases substantially the danger of the described formation of islands.

SUMMARY OF THE INVENTION

1. Purposes of the Invention

It is an object of the present invention to provide a hydrophobing agent which forms with a simple uncomplicated processing a uniform, closed coating on the surface to be treated.

It is another object of the present invention to provide a method for forming a substantially uniform coating, which is adhering and stable.

These and other objects and advantages of the present invention will become evident from the description which follows.

2. Brief Description of the Invention

According to the present invention, there is provided for a hydrophobing agent for the treatment of a surface, in particular a nozzle ejection opening surface of a liquid recording head. The hydrophobing agent comprises chain-like, cross-linkable halogen-containing copolymers, a cross-linking agent entering into cross-linking bonds with the copolymers, a first solvent having a first boiling point, and at least one second solvent with a second boiling point deviating from the first boiling point of the first solvent. The weight components, the first boiling point of the first solvent, and the second boiling point of the second solvent are metered such that the first solvent is substantially evaporated upon application of the hydrophobing agent to a surface, and the second solvent evaporates substantially only after application of the hydrophobing agent to the surface accompanied by formation of a hydrophobically acting layer. The hydrophobing agent can further comprise an accelerator.

The first solvent can be a tertiary butylacetate and the second solvent can be a γ-butyrolactone. A weight ratio of 10 to 30, and preferably of substantially 20, can exist between the tertiary butylacetate and the γ-butyrolactone.

A weight ratio of 10 to 30, and preferably of from about 15 to 25, can exist between the first solvent and the second solvent.

A weight ratio of from about 20 to 30 of the chain-like, cross-linkable halogen-containing copolymers to the weight of the first solvent plus second solvent can be present.

According to the present invention, an ink jet print head with several ink jet ejection nozzles, wherein an ink liquid can be ejected as desired from the ink jet ejection nozzles, includes that nozzle ejection opening surfaces, surrounding respective ink jet ejection nozzles, are covered in the area of the ink jet ejection nozzle with a hydrophobing agent. The hydrophobing agent can be composed of chain-like, cross-linked halogen-containing copolymers. A cross-linking agent can provide cross-linking bonds with the copolymers. A hydrophobically acting layer can be formed by evaporation of a second solvent substantially only after application of the hydrophobing agent to the nozzle ejection opening surface. The second solvent can be a γ-butyrolactone.

A method for hydrophobing an ink jet nozzle according to the present invention comprises the following steps. A mixture is prepared including a) chain-like, cross-linkable halogen-containing copolymers, b) a cross-linking agent entering into cross-linking bonds with the copolymers, c) a first solvent having a first boiling point, and d) a second solvent having a second boiling point deviating from the first boiling point of the first solvent, and wherein the weight components and boiling points of the solvents are determined such that the first solvent upon application on a surface to be coated is already substantially evaporated, whereas the second solvent evaporates substantially only after application accompanied by formation of a hydrophobically acting layer. The first solvent is substantially evaporated from the mixture during a path from an application apparatus to the surface to be coated. The mixture is applied to the surface to be coated. The coating is hardened on the surface by evaporation of the second solvent. An accelerator can be admixed to the mixture. The first solvent can be a tertiary butylacetate and the second solvent can be a γ-butyrolactone.

A weight ratio of 10 to 30 can exist between the tertiary butylacetate and the γ-butyrolactone. A weight ratio of 10 to 30 can exist between the first solvent and the second solvent. There can also exist a weight ratio of from about 15 to 25 of the first solvent to the second solvent and a weight ratio of from about 20 to 30 of the chain-like, cross-linkable halogen-containing copolymers to the weight of the first solvent plus second solvent.

In accordance with the present invention, a hydrophobing agent of the initially recited kind is furnished by at least a second solvent with a boiling point differing from the boiling point of a first solvent and by such metered weight components and boiling points of the solvents that the first solvent is already substantially evaporated upon application on the surface, whereas the second solvent evaporates substantially only after the application under formation of a hydrophobically acting layer.

A substantial advantage of the invention hydrophobing agent comprises that its flow and wetting behavior on the surface to be treated can to a larger extent be freely adjusted by a suitable tuning and a weight pressure of the two solvents relative to each other and of their respective boiling points. The first solvent, which upon application is evaporated nearly completely, for example, up to a few weight-percent, for example, 5 weight-percent or 10 weight-percent, allows a good storage of the hydrophobing agent prior to its application and imparts the hydrophobing agent during processing with advantageous, low-viscosity properties, for example, during the ejection from a spray nozzle. While the first solvent is already evaporated to a large extent, when the hydrophobing agent impinges on the surface to be coated, a still highly viscous behavior of the hydrophobing agent is assured by the presence of the second solvent such that the individual hydrophobing agent droplets can converge. An extremely uniform, smooth and to a high degree hydrophobically acting coating is formed after a slow evaporation of the second solvent on the surface to be treated. This coating advantageously also covers particle inclusions and unevennesses of the surface and, which, for example, is suitable in connection with liquid recording heads also for a balancing and smoothing of so-called nozzle break-outs, i.e., of defective nozzle edges.

The hardening speed can be substantially increased based on an advantageous embodiment of the hydrophobing agent of the present invention, by including an accelerator in the hydrophobing agent.

A hydrophobing agent according to the present invention has proved to be particularly advantageous with respect to the processing capability and the formed hydrophobically acting layer, where one solvent of the hydrophobing agent is a tertiary butylacetate and where a further solvent of the hydrophobing agent is γ-butyrolactone. Preferably, the hydrophobing agent includes the tertiary butylacetate in a weight ratio from 10 to 30, and preferably of approximately 20 relative to the γ-butyrolactone.

An ink print head with several ink jet ejection nozzles where, as required, an ink liquid can be ejected from the ink jet ejection nozzles, can be coated particularly advantageously in the area of the ink jet ejection nozzles with the hydrophobing agent according to the present invention. The hydrophobing agent according to the present invention exhibits in fact an excellent adhesion stability also at temperatures above approximately 60° C., which adhesion stability is not interfered with even by frequent wiping.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

Figure 1:
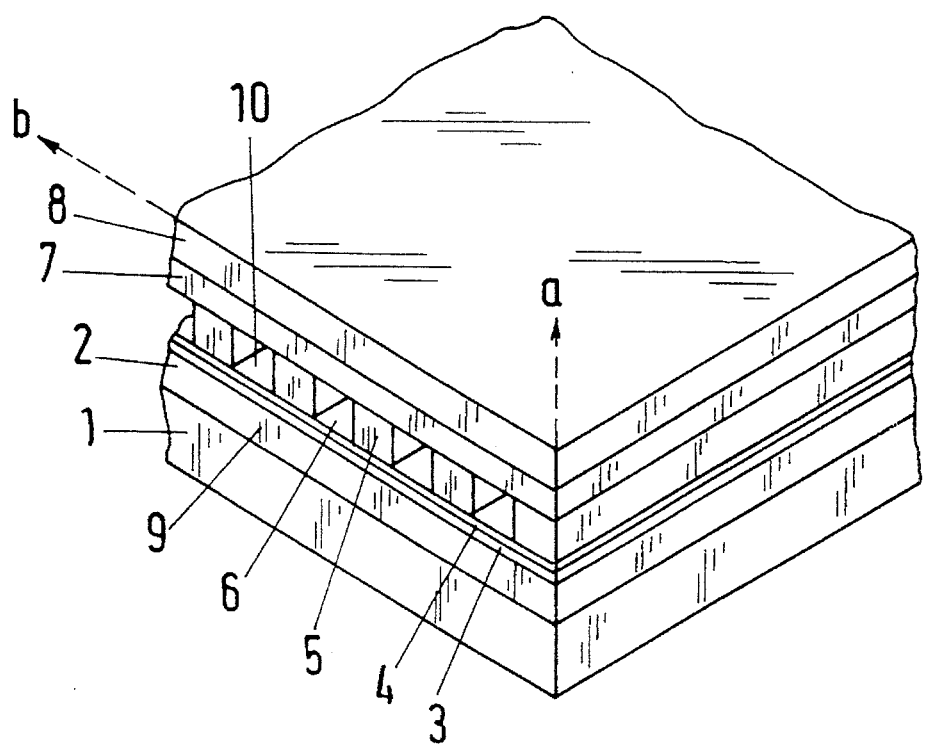
FIG. 1 is a schematic view of an ink jet print head.

FIG. 1 shows an ink jet print head produced according to the layer construction principle, wherein a silicon substrate 2 is adhesively attached to a metal platelet 1. Two silicon dioxide layers 3 and 4 are disposed above the silicon substrate as insulating and covering layers. Electrical conduits and resistance heating elements are embedded between the two silicon dioxide layers 3 and 4. The electrical conduits and resistance heating elements are not shown for purposes of simplicity. The electrical conduits and the resistance heating elements are in each case coordinated to ink-filled ink channels 6. The ink channels 6 are realized and furnished in a photolacquer layer, which can be formed by an acrylate resin. The upper boundary of the ink channels 6 is formed by an acrylate layer 7 with a glass plate 8 adhesively attached on top of the acrylate layer 7. The ink channels 6 end at a nozzle ejection opening surface 9 in each case in nozzles 10. The nozzle ejection opening surface 9 is disposed in a plane spanned by the coordinate axes a and b. In case of an application of current of one of the resistance heating elements, not shown, there is formed a vapor bubble in the coordinated ink channel 6, and wherein the vapor bubble collapses instantly upon termination of the application of current. Based on this, an ink droplet is driven out of the corresponding nozzle 10. The capability of functioning and the reproducibility of the ink jet droplet size, as well as the take-off direction, are substantially determined by the surface properties of the nozzle ejection opening surface 9, where the nozzle ejection opening surface 9 is covered with a hydrophobing agent for improving the aforecited properties.

If the hydrophobing agent contains only one solvent, the changes of the formation of islands 20 exists, as a result of an insufficient convergence of the droplets of the hydrophobing agent 21, applied to and around the nozzle ejection opening surface 9. In order to improve the convergence, the portion of the solvent can in fact be increased whereby, however, the hydrophobing agent tends to run off the nozzle ejection opening surface 9, which is undesired.

Figure 3:
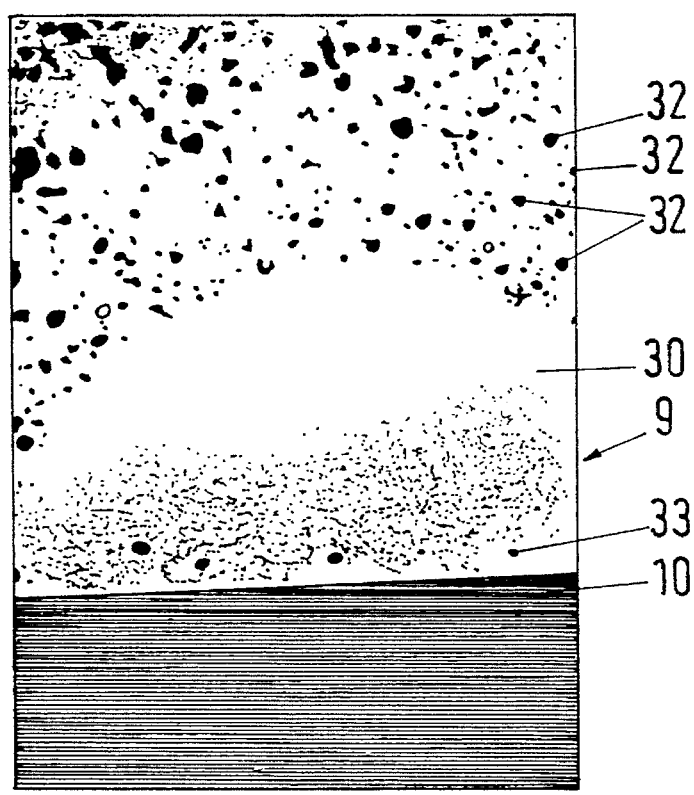
FIG. 3 shows is a greatly, enlarged representation of a nozzle ejection opening region of an ink jet print head coated with a hydrophobing agent according to the present invention.
Figure 2:
FIG. 2 is a schematic diagram illustrating a nozzle ejection opening region of an ink jet print head coated with a conventional hydrophobing agent.

FIG. 3 shows the nozzle ejection opening surface 9 of an ink jet print head according to FIG. 1, where the nozzle ejection opening surface 9 is coated with the hydrophobing agent 30 according to the present invention. The black dots 32, recognizable in FIG. 3, represent ink residues occurring based on the operation of the ink jet nozzle of the print head. The ink residues are however disposed at a large distance relative to the nozzles 10 of the ink jet print head. No ink residues 32 are present in the neighborhood of the nozzle 10. Ink residues 33 are recognizable only in singular cases at a sufficient distance from the ink jet nozzles 10. An ink jet print head coated with the hydrophobing agent according to the present invention thus exhibits no ink residues in the region of its ink jet nozzles 10, where the ink residues could influence the droplet formation with respect to size and take-off direction. Therefore, a hydrophobing agent of the present invention enables a highly precise and reproduceable formation of an image dot generation based on the drop of the ink ejection.

Figure 4:
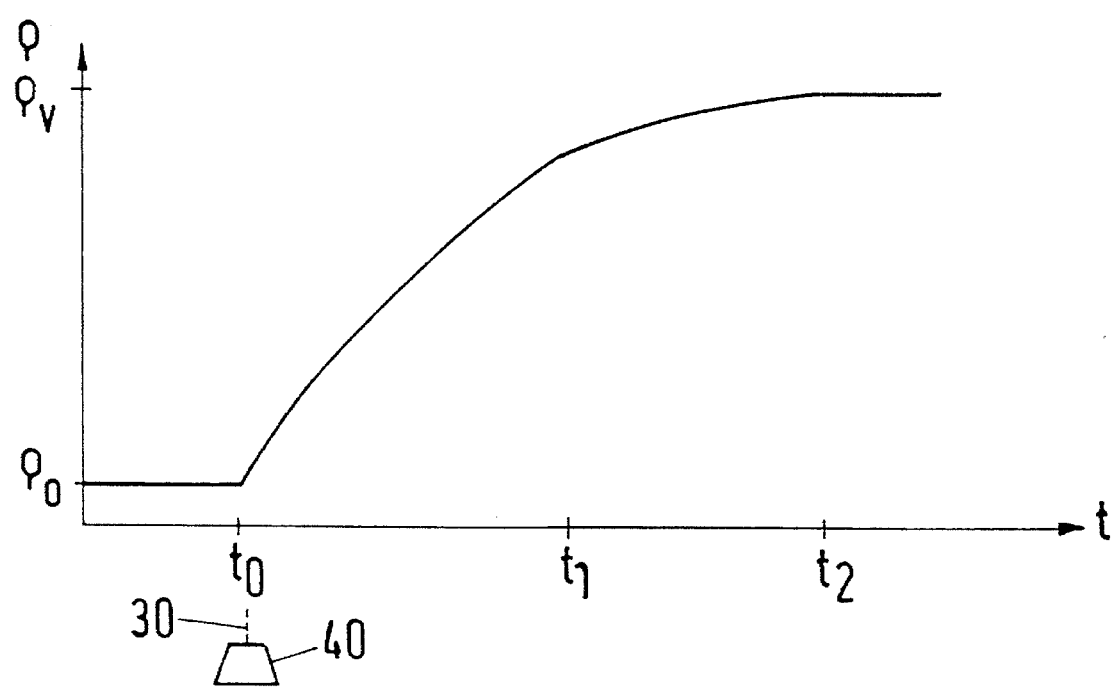
FIG. 4 is a schematic view of a representation of the viscosity of the hydrophobing agent according to the present invention upon application depending on time.

FIG. 4 shows the connection and the relationship between the viscosity $\rho$ or, respectively, the cross-linking and the time t during the cross-linking and drip formation and the time t of the hydrophobing agent 30 according to the present invention. The hydrophobing agent 30 exhibits a relatively small viscosity $\rho_o$ up to the processing point in time $t_o$, which relatively small viscosity $\rho_o$ allows a very simple processing and a good storage. The hydrophobing agent 30 is sprayed from a spray nozzle 40, schematically indicated, at the point in time $t_o$ in direction toward the surface to be coated. The hydrophobing agent 30 impinges on the surface to be coated at a point in time $t_1$. The time duration $t_1-t_o$ can be adjusted within wide ranges based on processing parameters, i.e. in particular, the spray pressures, the distance between the spray nozzle and the surface, the ambient temperature, and the degree of atomization. The time duration $t_1-t_o$ is preferably adjusted such that at the point in time $t_1$, i.e. at the point in time when a first one of the solvents has substantially evaporated, the hydrophobing agent impinges on the surface to be treated. This causes a relatively strong increase in the viscosity $\rho$, compare the course of the curve between $t_o$ and $t_1$ in FIG. 4. When the hydrophobing agent impinges on the surface to be treated, the viscosity of the hydrophobing agent is essentially only determined by the presence of the second solvent, which exhibits a substantially higher boiling point and thus, a lower volatility. With increasing escaping and evaporation of the second solvent, the hardening or, respectively, cross-linking of the hydrophobing agent on the surface occurs up to the complete cross-linking viscosity $\rho_v$ at the point in time $t_2$ of FIG. 4. The second solvent serves upon selection of a corresponding boiling point and of a suitable weight component for the optimization of the converging of the applied hydrophobing agent droplets on the surface. Such a highly viscous behavior of the hydrophobing agent is already set with the evaporation of the one solvent that the hydrophobing agent cannot run-off from the surface. A suitable setting of the process parameters is only to assure that the one, easily volatile solvent has substantially evaporated at the point in time $t_1$. The residual parts, for example 10 weight-percent, or a complete evaporation already prior to the point in time $t_1$ are tolerated in relatively wide ranges. The adjustable process parameters thus can exhibit relatively large tolerances.

The hydrophobing agent according to the present invention can for example contain 200 mg of a cross-linkable fluorine-containing copolymer which is for example commercially available under the trade name Genoflon, and is known from the Printed European Patent Document EP-B1-0,150,430, where in this case a specific reference is made to the preparation of such copolymers. The first, low-boiling solvent is 8 g of tertiary butylacetate having a boiling point of 97° C. An amount of 400 mg γ-butyrolactone having a boiling point of 205° C. is used as the second high boiling point solvent. In addition, also 0.28 mg dibutyltin dilaurate can be added as accelerator. In addition, the hydrophobing agent contains 80 mg diphenylmethyl-4,4'-diisocyanate as cross-linking agent, providing a hardening system. The absolute temperature °K. ratio of the second boiling point of the second solvent to the first boiling point of the first solvent can be larger than 1.1 and is preferably larger than 1.2 and more preferably larger than 1.25 and can be smaller than 2 and is preferably smaller than 1.5.

The composition recited above allows to obtain excellent hydrophobically acting coatings, in particular in connection with ink jet print heads, where the hydrophobically acting coatings are characterized by an extremely high mechanical stability and a completely closed surface, as illustrated in FIG. 3. The coating allows to a large extent a balancing or smoothing of unevennesses at the nozzle ejection opening surface 9, shown in FIG. 1, and exhibits also in partial regions with insufficient adhesion a very high overall stability and mechanical strength in itself and in connection with the nozzle ejection opening surface 9. Furthermore, the layer is extremely well suitable for the smoothing of so-called nozzle breakouts.

It will be understood that each of the elements described above, or two or more together, may also find a useful application in other types of water-repellent agents and structures differing from the types described above.

While the invention has been illustrated and described as embodied in the context of a hydrophobing agent for treatment of a surface, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A hydrophobing agent for treatment of a surface, of a nozzle ejection opening surface of a liquid recording head, where the hydrophobing agent comprises
   a) chain-like, cross-linkable halogen-containing copolymers;
   b) a cross-linking agent entering into cross-linking bonds with the copolymers;
   c) a first solvent having a first boiling point, and
   d) at least one second solvent having a second boiling point deviating from the first boiling point of the first solvent, and wherein a first weight fraction and the first boiling point of the first solvent, and a second weight fraction and the second boiling point of the second solvent are furnished such that the first solvent is evaporated upon application of the hydrophobing agent to the surface, and wherein the second solvent evaporates only after application of the hydrophobing agent to the surface accompanied by formation of a hydrophobically acting layer.

2. The hydrophobing agent according to claim 1, wherein the hydrophobing agent further comprises an accelerator.

3. The hydrophobing agent according to claim 1, wherein the first solvent is a tertiary butylacetate.

4. The hydrophobing agent according to claim 3 wherein the second solvent is a γ-butyrolactone.

5. The hydrophobing agent according to claim 4, wherein the hydrophobing agent before evaporation contains the tertiary butyl acetate in a weight ratio of 10 to 30 relative to the γ-butyrolactone.

6. The hydrophobing agent according to claim 4, wherein the hydrophobing agent before evaporation contains the tertiary butyl acetate in a weight ratio of substantially 20 relative to the γ-butyrolactone.

7. The hydrophobing agent according to claim 1, wherein the hydrophobing agent before evaporation contains the first solvent in a weight ratio of 10 to 30 relative to the second solvent.

8. The hydrophobing agent according to claim 1, wherein the hydrophobing agent before evaporation contains the first solvent in a weight ratio of from about 15 to 25 relative to the second solvent.

9. The hydrophobing agent according to claim 1, wherein the hydrophobing agent before evaporation contains the chain-like, cross-linkable halogen-containing copolymers in a weight ratio of from about 20 to 30 relative to the weight of the first solvent plus second solvent.

10. An ink jet print head with several ink jet ejection nozzles (10), wherein an ink liquid is ejectable from the ink jet ejection nozzles (10), wherein nozzle ejection opening surfaces (9) surrounding respective ink jet ejection nozzles (10) are covered in an area of the ink jet ejection nozzle (10) with a hydrophobing agent (30), wherein the improvement comprising the hydrophobing agent is composed of chain-like, cross-linked halogen-containing copolymers, wherein a cross-linking agent provides cross-linking bonds with the copolymers, a first solvent and a second solvent, and wherein a hydrophobically acting layer is formed by evaporation of the second solvent only after application of the hydrophobing agent to the nozzle ejection opening surfaces.

11. The ink jet print head according to claim 10, wherein the second solvent is a γ-butyrolactone.

12. A method for hydrophobing an ink jet nozzle comprising the steps of preparing a mixture including
   a) chain-like, cross-linkable halogen-containing copolymers,
   b) a cross-linking agent entering into cross-linking bonds with the copolymers,
   c) a first solvent having a first boiling point, and
   d) a second solvent having a second boiling point deviating from the first boiling point of the first solvent, and wherein a first weight fraction and the first boiling point of the first solvent and a second weight fraction and the second boiling point of the second solvent are determined such that the first solvent upon application on a surface to be coated with the mixture is already evaporated, whereas the second solvent evaporates only after application accompanied by formation of a hydrophobically acting layer; substantially evaporating the first solvent from the mixture during a path from an application apparatus to the surface receiving the mixture for coating; applying the mixture to the surface to be coated with the mixture; hardening a coating on the surface by evaporation of the second solvent.

13. The method for hydrophobing according to claim 12, further comprising
   admixing an accelerator to the mixture.

14. The method for hydrophobing according to claim 12, wherein the first solvent is a tertiary butylacetate.

15. The method for hydrophobing according to claim 14, wherein the second solvent is a γ-butyrolactone.

16. The method for hydrophobing according to claim 15, wherein the hydrophobing agent before evaporation contains the tertiary butylacetate in a weight ratio of 10 to 30 relative to the γ-butyrolactone.

17. The method for hydrophobing according to claim 13, wherein the hydrophobing agent before evaporation contains the first solvent in a weight ratio of 10 to 30 second solvent.

18. The method for hydrophobing according to claim 13, wherein the hydrophobing agent before evaporation contains the first solvent in a weight ratio of from about 15 to 25 relative to the second solvent, and wherein the hydrophobing agent before evaporation contains the chain-like, cross-linkable halogen-containing copolymers in a weight ratio of from about 20 to 30 relative to the weight of the first solvent plus second solvent.

* * * * *